(12) United States Patent
Opina, Jr. et al.

(10) Patent No.: US 8,631,275 B2
(45) Date of Patent: Jan. 14, 2014

(54) CONTROLLER ARRANGEMENT OF AN ELECTRICAL POWER TRANSFER SYSTEM OF A WIND TURBINE

(75) Inventors: Gil Lampong Opina, Jr., Singapore (SG); Swee Yee Fonn, Singapore (SG); Anshuman Tripathi, Singapore (SG); Tze Yang Liaw, Singapore (SG); Amit Kumar Gupta, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 179 days.

(21) Appl. No.: 12/979,918

(22) Filed: Dec. 28, 2010

(65) Prior Publication Data

US 2011/0106325 A1    May 5, 2011

(51) Int. Cl.
*G06F 11/00* (2006.01)
*F03D 7/00* (2006.01)

(52) U.S. Cl.
USPC ............... 714/13; 714/10; 290/44; 290/52; 290/55

(58) Field of Classification Search
USPC .................................................. 714/10, 13
See application file for complete search history.

(56) References Cited

U.S. PATENT DOCUMENTS

| | | | |
|---|---|---|---|
| 4,525,633 A * | 6/1985 | Wertheim et al. | 290/44 |
| 6,850,426 B2 * | 2/2005 | Kojori et al. | 363/123 |
| 7,339,355 B2 | 3/2008 | Erdman et al. | |
| 7,608,937 B1 | 10/2009 | Altenschulte | |
| 2002/0190695 A1* | 12/2002 | Wall et al. | 322/17 |
| 2007/0164567 A1* | 7/2007 | Luetze et al. | 290/44 |
| 2009/0001725 A1 | 1/2009 | Llorente Gonzalez et al. | |
| 2010/0025995 A1* | 2/2010 | Lang et al. | 290/44 |
| 2010/0060000 A1 | 3/2010 | Scholte-Wassink | |
| 2011/0204857 A1* | 8/2011 | Casteel et al. | 322/59 |

FOREIGN PATENT DOCUMENTS

| | | |
|---|---|---|
| DE | 10 2007 018 952 A1 | 10/2008 |
| EP | 1 798 837 A2 | 6/2007 |
| EP | 1 841 036 A2 | 10/2007 |
| EP | 1863162 A2 | 12/2007 |
| EP | 1 959 534 A1 | 8/2008 |
| EP | 2 056 424 A2 | 5/2009 |
| EP | 2 093 420 A2 | 8/2009 |
| EP | 2 169 800 A2 | 3/2010 |
| EP | 2161443 A2 | 3/2010 |
| EP | 2362534 A2 * | 8/2011 |
| EP | 2475061 A1 * | 7/2012 |
| WO | 2006/107548 A1 | 10/2006 |

OTHER PUBLICATIONS

Sybase, Using Sybase Failover in a High Availability System, 2005, Sybase Inc., Chapter 1.*
Sybase, "Adaptive Server® Enterprise 15.0" Copyright © 1987-2005 by Sybase, Inc. All rights reserved.
European Patent Office, European Search Report issued in related European application No. 11010072.4 dated Jun. 11,2012.

* cited by examiner

*Primary Examiner* — Mark Connolly
(74) *Attorney, Agent, or Firm* — Patterson & Sheridan, LLP (57) ABSTRACT

A controller arrangement of an electrical power transfer system (1) of a wind turbine is described. The wind turbine has an electrical generator and is connected to an electrical power grid, wherein the power transfer system (1) is arranged to transfer electrical power from the generator to the grid. The power transfer system (1) has at least two electrical elements (2-6), e.g. converters, and at least two controllers (15-17) each arranged to control at least one element (2-6).

34 Claims, 5 Drawing Sheets

CONTROLLER ARRANGEMENT OF AN ELECTRICAL POWER TRANSFER SYSTEM OF A WIND TURBINE

FIELD OF THE INVENTION

The invention relates to the field of wind-energy conversion and, for example to a controller arrangement of an electrical power transfer system of a wind turbine arranged to transfer electrical power from the generator to an electrical power grid.

BACKGROUND

EP 2 161 443 A2 describes a wind turbine with a generator and a power transfer system to feed electric power into a utility grid. The power transfer system has a master controller and two power converters, a main and an auxiliary converter, each including suitably adapted slave controllers. In an emergency event the (former slave) controller of the auxiliary converter operates as an independent master to regulate the power flow to an internal supply grid.

SUMMARY OF THE INVENTION

A controller arrangement of an electrical power transfer system of a wind turbine is provided. The wind turbine comprises an electrical generator and is connected to an electrical power grid. The power transfer system is arranged to transfer electrical power from the generator to the grid. The power transfer system comprises at least two electrical elements and at least two controllers each arranged to control at least one element, wherein at least one controller is arranged to control only one of the elements as well as at least two of the elements. The controller arrangement enables a first element to be controlled by a first controller and a second element to be controlled by a second controller, as well as the first and the second element to be controlled by the first controller while the first or the second element is not controlled by the second controller.

According to another aspect, a method of controlling a controller arrangement of an electrical power transfer system of a wind turbine is provided. The wind turbine comprises an electrical generator and is connected to an electrical power grid. The power transfer system is arranged to transfer electrical power from the generator to the grid. Further, the power transfer system comprises at least two elements and at least two controllers each arranged to control at least one element, wherein at least one controller is arranged to control only one of the elements as well as at least two of the elements. The method comprises: switching between 1) controlling a first element with a first controller and a second element with a second controller and 2) controlling the first and the second element with the first controller while not controlling the first or the second element with the second controller.

Other features are inherent in the products and methods disclosed or will become apparent to those skilled in the art from the following description and the accompanying drawings.

BRIEF DESCRIPTION OF THE DRAWINGS

Embodiments of the present invention are explained by way of example with reference to the accompanying drawings, in which.

The drawings and the description of the drawings are of embodiments of the invention and not of the invention itself.

DETAILED DESCRIPTION

Embodiments relate to a controller arrangement of an electrical power transfer system of a wind turbine and to a method of controlling it. The wind turbine produces electric power by driving the generator with a wind-turbine rotor. The generated power is transferred by the power transfer system from the generator to an electrical power grid, e.g. a public grid connected to the wind turbine. For this functionality, the transfer system comprises electrical elements, e.g. a power converter, power components (e.g. filters, breakers/contactors etc) and/or a transformer, and controllers to control the elements. The generator and the grid are at least one source and load of electric power respectively.

The sharing of controllers is facilitated by at least a first controller being arranged to control only one of the elements as well as at least two of them. Thus, it is possible to switch between at least two operating modes: 1) Controlling a first element with the first controller and (independently controlling) a second element with a second controller (referred to as "independent" mode herein). And, to obey sharing, 2) controlling the first and the second element with the first controller while not controlling the first or the second element with the second controller (referred to as "sharing mode" herein). In the sharing mode, the second element (which was controlled by the second controller before, according to the independent mode) is now controlled by the first controller, while the first controller is (still) controlling the first element. Thus, the first controller is shared to control both, the first and the second element. Controller sharing may enhance throughput and/or reliability of the power transfer system and/or provide redundancy.

Before turning to the detailed description of embodiments on the basis of the drawings, a few more general items of embodiments will be discussed.

In some of the embodiments, the independent mode is a normal operating mode of the wind turbine. Hereinafter, the wording "normal mode" describes an operating mode, wherein the wind turbine is producing electric power while the power transfer system is working faultlessly. In some embodiments, the sharing mode is a normal mode of the wind turbine. Since the first controller controls the second element in the sharing mode, the second controller may turned off, thus increasing lifetime and availability of power from the turbine to the grid. In some implementations, the power transfer system is arranged to operate both modes, independent and sharing mode, as normal modes.

In some embodiments, the switching between the at least two modes (independent and sharing mode) of operation is triggered by a fault condition. It should however be noted that the switching between the at least two modes can also be triggered by any other conditions related to the performance improvement of the power transfer system in other embodiments. In one implementation the operating mode is switched from the independent mode to the shared mode in response to the fault condition, thus cancelling the controlling of the second element by the second controller. (Then the shared mode is not a normal mode.) Thereby the second controller is not needed any longer to control the second element and a fault caused by the second controller will not affect the health of the power transfer system. Further embodiments, concerning the cooperation of the elements and controllers are described below.

In some embodiments the elements are associated with controllers, for example the number of controllers is the same as the number of the elements controlled by these controllers, or, alternatively, the number of controlled elements is twice the number of the corresponding controllers.

Before describing more details concerning operating and sharing controllers, a few more aspects of the power transfer system will be discussed.

In some embodiments, the generator is a single power source, for example of electrical AC power source. In other embodiments, the generator provides at least two power sources, for example each of AC power source. In some implementations, the generator provides at least one single phase AC power source. In some other implementations, the generator provides at least one of a multi-phase AC power source, e.g. a three-phase AC power source.

In one implementation, the generator may be divided into a plurality of generator segments, which produce a plurality of independent AC power outputs and thus represent separate power sources. Segmented generators increase the reliability of a generator as well as availability of power, since generator fault events mostly concern single generator segments only, such that the other segments may continue to operate.

In some embodiments, the electrical power grid is a single power load. In other embodiments, the electrical power grid is at least two power loads. In some implementations, the grid provides at least one single phase AC power load. In some other implementations, the grid provides at least one of a multi-phase AC power load, e.g. a three phase AC power load.

The power transfer system couples the at least one power source to the at least one load by providing at least one power path between the at least one source and the at least one load. Since the power generated by the generator depends on the rotational speed of the wind-turbine rotor (e.g. frequency, amplitude and/or phase of AC voltage output might be affected), the power transfer system converts, in one example, electrical AC power from the wind turbine generator into AC power matching the requirements of the grid or the wind farm operator and, finally, feeds the power into the grid. More details of this are described below.

In some embodiments, at least two of the elements are electrical power converters and at least two of the controllers are converter controllers. Each of the converter controllers is arranged to control at least one converter. At least one of the converter controllers is arranged to control one as well as two converters.

In one embodiment, for example if the transfer system couples a single power source to a common load, the converters may be electrically connected in parallel providing different power paths. In other examples, the converters may not be connected at their inputs or their outputs or both, for example if the converters are coupled to different power sources or different loads or both. If galvanic coupling is provided only at one side of the converters or not at all, cross current flow from one converter to the other may be avoided or at least limited.

Providing a plurality of converters in parallel allows current to bedistributed, with the result that lower currents flow through the individual converters. Furthermore, implementations with plural (not necessarily strictly parallel) converters may enhance the reliability and availability of the power conversion system and provide redundancy. For example, each converter may comprise or be connected with controllable switches to isolate, and thus deactivate, individual converters from the at least one power source and/or the at least one load. In addition, at least two converters may be coupled via controllable switches to allow deactivated converters to be bypassed. Thus, in some examples it may be possible to distribute all or part of the power otherwise routed through the deactivated converter to one or more other converters or elements of the transfer system. In other implementations which connect the converters to dedicated power sources, for example dedicated generator segments, the transfer system may continue to operate with reduced power output if one of the converters is deactivated.

According to some embodiments, the power transfer system comprises at least one AC/DC-converter as an element, which is for example arranged to provide DC power converted from an AC source or the generator. In some implementations the AC/DC-converter comprises a passive rectifier or an active rectifier, e.g. a phase controlled rectifier with semiconductor switches controlled by the converter controller.

In some embodiments, the power transfer system comprises at least one DC/AC-converter as an element, which is for example arranged to provide AC power converted from a DC source i.e. the power from the generator at the DC-link. In some implementations, the DC/AC-converter comprises semiconductor switches controlled by the converter controller. By adequately switching the semiconductor switches with pulse width modulation (PWM) signals a (essentially) sinusoidal output waveform is achieved at the converter terminals to deliver the demanded power at the load side.

In some embodiments, the power transfer system comprises at least one DC-link arranged to couple at least one AC/DC-converter and at least one DC/AC-converter. In some implementations, at least one frequency converter of the power transfer system is built by at least one source side AC/DC-converter and at least one a load side DC/AC-converter coupled by at least one DC-link. In the following, the expression "source side" denotes that an element is closer to the source than a reference element. The expression "load side" denotes that an element is closer to the load than the reference element. In some implementations, the frequency converter is arranged to convert/transfer electric power at the AC source or the generator to AC power demanded by the load or the grid by adapting AC frequencies, amplitudes and/or phases. For example, the converter controller synchronizes the frequency and the phase with the grid's AC voltage and regulates the amplitude and the phase of the AC voltage produced by the power converter to a value suitable to feed the demanded power into the grid. In some implementations, necessary information concerning the source side and the load side's frequency, phase and amplitude are provided by at least one source-load-management-controller, described below.

In some embodiments a frequency converter is an element of the transfer system, thus the converter controller is a frequency converter controller that is arranged to control several components of this element, e.g. the AC/DC-converter, the DC/AC-converter and the DC-link in between, all being members of the frequency converter as an element.

In one example, at least two DC-links may be coupled via controllable switches. This may enable bypassing converters, e. g. a load side DC/AC-converter or a source side AC/DC-converter. Moreover, connecting the DC-links may improve DC-link voltage balance of different power paths.

In addition, the transfer system may comprise at least one controllable switch to isolate at least one source side AC/DC-converter and/or at least one load side DC/AC-converter from at least one power source and at least one load respectively.

In some embodiments, at least two of the elements are power dissipation units and at least two of the controllers are power dissipation unit controllers. The number of dissipation units may be the same as the number of converters or DC-links or half the number of converters, e.g. one power dissipation unit per frequency converter.

Each dissipation unit may comprise one or more dissipating components which are able to convert electrical power to be dissipated into heat or into a different form of energy, for example one or more resistors. In one example, the amount and/or rate of power dissipation may be controlled, e. g. by means of PWM signals controlling corresponding switches.

Herein, the expression "power to be dissipated" refers to power present in a power path of the power transfer system which cannot be handled properly by the converters or any other element of the system due to a fault event of some kind. For example, the dissipation unit is arranged to dissipate power which is input to a converter from the at least one power source, but cannot be converted/transferred due to a converter fault; or excess power input to a converter, because the rotor of the wind turbine connected to the generator representing the at least one power source goes into overdrive i.e. producing more power; or residual power in the DC-link after deactivation of a converter. Thus, the at least one dissipation unit may be coupled to at least one power path of the transfer system, e.g. to at least one converter and/or to at least one DC-link. Dissipating such power may protect electronic components of the system and thus prolong their life cycle.

In some embodiments, the power dissipation unit is coupled to the power path via one or more controllable switches. In some alternative embodiments, in particular if the amount of power dissipation may be controlled and dissipation is not initiated automatically as soon as power is available as input to the dissipation unit, the dissipation unit may be permanently coupled to the power path, especially to the converter, without using switches.

According to some embodiments, the at least two dissipation units are coupled (to each other) via controllable switches. On the one hand, this enables distributing power to be dissipated to at least two dissipation units, thus allowing larger amounts of power to be dissipated without providing larger dissipation units and protecting the separate dissipation units from overload or wear e. g. during long duration fault events. On the other hand, the dissipation units may be coupled to enable a (e. g. faulty) dissipation unit to be bypassed in one example, thus providing redundancy. In some embodiments, all dissipation units may be coupled to each other via lines which are interrupted by the controllable switches.

In some embodiments, e.g. if the input power is a multi-phase AC power provided by multiple phase lines, the dissipation units may comprise a number of dissipating components (e. g. resistors) which is equal to the number of phases (phase lines) of the input power. In the event that the multi-phase AC input power is to be dissipated, each dissipating component may be coupled to a corresponding phase line. Alternatively, the dissipation unit may comprise an AC/DC converter, e.g. active/passive rectifier, to convert the AC power into DC power; the DC power may then be dissipated by a single power dissipating component. The single power dissipating component may be a bank of power dissipation elements.

In some implementations, the at least one controllable switch in some embodiments is controlled by at least one controller. For example, it is controlled by a controller controlling an element adjacent to or associated with the switch, e.g. the power dissipation unit controller or the converter controller. In some embodiments, the switch is a logical or physical part of the element. In some embodiments, the switch is an (separate) element of the power transfer system with at least one switch controller arranged to control only one as well as at least two switches. Alternatively, the switch may be controlled by an electronic device which automatically provides for a connection under certain pre-determined conditions (e. g. diodes which are turned on at a predetermined voltage drop).

In some embodiments, at least one of generator and grid provides as elements at least two sources and loads respectively. At least two of the controllers are source-load-management-controllers each arranged to monitor at least one of the source and the load. Further tasks of this type of controller are described below.

Generally, the aspects of controller sharing should be understood to be applicable to all controller types described before and hereinafter.

Now turning back to further details of the controllers, in some embodiments a controller of a specific type is arranged to communicate with a controller of different type. For example, the power transfer system comprises at least one converter controller, at least one electrical power converter and at least one power dissipation unit controller, wherein the converter controller is arranged to provide at least one of information about itself and information about the power converter to the power dissipation unit controller. (Remark: this embodiment comprises at least one more element.)

In some embodiments, the controllers are arranged to fulfil a single task or a combination of several tasks, e.g. tasks listed in the next tree paragraphs. In some implementations controllers of the same type fulfil the same coverage of tasks. In some implementations, controllers of the same type are freely exchangeable in respect of controlling any elements of the same type and/or replacing physical devices representing the controllers.

In some examples, at least one source-load-management-controller is arranged to handle at least one of the following tasks: monitoring the state of at least one source and/or at least one load; providing event information to other controllers, e.g. source status and error, load status and error, source-load-management-controller status and error; providing system commands, e.g. start up, shut down, generate power; providing an (especially real-time) information signal, e.g. about desired individual converter power set points, available source power and/or load power consumption.

In some examples, at least one converter controller is arranged to handle at least one of the following tasks: monitoring and/or controlling converters and/or adjacent switches; establishing a healthy transfer system and/or optimizing the power throughput based on the available wind by cooperating with other controllers; providing event information to other controllers, e.g. converter status and error, converter controller status and error; providing an (especially real-time) information signal, e.g. about converter power throughput, energy stored in the power path, in the converter and/or in the DC-link.

In some examples, at least one power dissipation unit controller is arranged to handle at least one of the following tasks: monitoring and/or controlling power dissipation units; optimizing power balance between different power paths, especially concerning different generator segments; providing event information to other controllers, e.g. power dissipation unit status and error, power dissipation unit controller status and error; providing an (especially real-time) information signal, e.g. about dissipated power and/or power dissipation unit health condition.

In some embodiments, at least one controller is realized as a physical device. For example, the controller comprises at least one microcontroller. For maintenance, all or at least two controllers are built as separate (physical) devices in some implementations. Alternatively, at least two controllers are integrated in a single (physical) device, e.g. some or all controllers concerning the same power path and/or some or all controllers of the same type may be integrated as modules in one physical device.

In some embodiments, at least one controller is realized as a logical unit, e.g. as a logical part of a common physical device or as a logical part of a program arranged to be executed by a computer. In some examples some or all controllers concerning the same power path and/or some or all controllers of the same type or at least two of any controllers are implemented as (separate) logical units.

In some embodiments, at least one controller is realized as or with a process arranged to be executed within a controller program or as an instance of a generic controller program executed by a computer. In some implementations, the controller program comprises several processes each representing a single controller. In some implementations, several controllers are realized by several instances of a controller program, each instance representing a single controller. In some other implementations, all controllers concerning one specific power path or all controllers of the same type are commonly realized by a single process or by a single instance of a controller program.

Communication between controllers is for example realized by at least one of physical communication links, shared memory and inter-process communication.

In some implementations information provided by one controller is shared with at least one adjacent controller, with at least all the controllers of the same type, with at least all the controllers concerning the same power path, with all the controllers of the power transfer system, and/or with the wind turbine's main controller.

In some embodiments, at least the first controller is arranged to control at least two elements in unison. In that case, the controller treats these elements in the same way and does not distinguish between them. In some examples, the controller does not have to know about how many elements it is controlling. In some implementations the at least two elements are, e.g. physically or logically, connected to the controller in parallel, e.g. by switches or by shared memory. Thus, each control command generated by the controller may (simultaneously) be transmitted to the controlled elements. In some implementations the at least two elements are connected chain wise in series. Thus, a specific control command is passed through from a preceding chain member to a succeeding chain member.

In some other embodiments, at least the first controller is arranged to (essentially) control at least two elements independently. In that case, each of these controllers is arranged to distinguish between at least two elements, e.g. by providing different control commands and/or different timing of control commands for distinct elements. In some implementations, at least one controller is arranged to behave like at least two independent controllers each controlling at least one element separately.

In some embodiments, a control command comprises a complex task, e.g. convert a specific power or synchronize phases of source side and/or load side voltages. In some implementations, the control command comprises at least one parameter, e.g. a value of an AC voltage amplitude. Such control commands are interpreted by a microcontroller of the element or by a process representing the controller, in some implementations.

In some other embodiments, a control command is arranged to directly drive hardware or a process, e.g. an electric signal to control a semiconductor switch, an electric signal to trigger a microcontroller or a specific value in a shared memory.

In some embodiments, at least the second controller is arranged to generate a signal targeted to at least the first controller to provide at least one of information about itself and information about at least one of the elements controlled by it. In some implementations, address information is enclosed in the signal to address at least one specific controller, e.g. to address a particular controller, a group of controllers of the same type or controllers concerning the same power path. This enables direct communication between at least two controllers.

In some embodiments, at least the second controller is arranged to generate a broadcast signal to provide at least one of information about itself and information about at least one of the elements controlled by it. In that case the controller (easily) provides information to all controllers listening to these broadcasts, especially without having to know about the controllers that are listening.

In some embodiments, a controller receiving a signal from another controller decides whether to ignore the signals information or not. Thus, a broadcast signal might be sent even to controllers that do not need the signal. So the sending controller needs no effort on correct addressing. In some implementations the controllers are organized and communicate without a master-slave structure. In some examples, a distributed controller system is realized with receiving controllers reacting (only) to signals concerning them.

In some embodiments, at least two controllers are arranged to support synchronous information exchange. For example, the first controller is arranged to request information from the second controller, which is arranged to provide this information on request.

In the same or in alternative embodiments, at least two controllers are arranged to support asynchronous information exchange. For example, the second controller is arranged to send information unasked, e.g. at fixed time intervals, as soon as new information is available and/or as soon as a value changes more than a specific threshold.

In some embodiments, all or at least two controllers are interfaced to a main controller, e.g. a wind turbine main controller, see below. This main controller can be distinguished from the (other) controllers described so far. In some implementations, the main controller is arranged to function as master for the (other) controllers, that are then arranged to function as slaves. So, the main controller may manage the controller sharing.

In some other embodiments, at least the first controller is arranged to decide in a stand-alone manner whether to control only one element or to control at least two elements at the same time. Thus, the main controller is not needed for controller sharing. In some implementations, the controllers are arranged to act as a self organizing network. For example, if a fault of the second controller occurs, the first controller can take over the tasks of the second controller autonomously, e.g. by finding a decision based on status or error information sent by the second controller or based on the fact that the second controller does not send signals any more.

In some embodiments, the generator and the grid provide at least one source and load respectively. The power transfer system comprises at least two electrical power converters and at least one power dissipation unit as elements, at least two converter controllers, at least one power dissipation unit controller and a power path arranged to transfer electrical power to the load. The method comprises: Controlling a first converter with a first converter controller and a second converter with a second converter controller with both converters being connected to the power path. (Here, this is the normal mode described before.) In response to a fault condition caused by the second controller: disconnecting the second converter from the power path and connecting the power channel to the power dissipation unit controlled by the power dissipation unit controller; handing over the second converter to the first converter controller; disconnecting the second converter from the power dissipation unit and reconnecting the second converter to the power path.

In this embodiment the second converter is handed over to the first converter controller, e.g. if the second controller breaks down. The second converter may be disconnected as early as possible from the power path and connected to the power dissipation unit, e.g. to minimize the fault from propagating further in the system and/or to protect power and electronic components of the system. Then the hand over takes place, i.e. the (not faulty) first converter controller takes over control over the second converter. Thus, the first converter controller is shared to control both converters, the first and the second one. Finally, the (faulty) second converter controller is not needed any longer to control the second converter (and may be reset or replaced).

In some embodiments, the hand-over of an element to be controlled is initiated by the second controller, i.e. the controller controlling the element before the hand over. In some implementations, the second controller communicates a request to hand-over the control to a specific (first) controller. In some other implementation, the second controller communicates such a request to at least two controllers, e.g. all controllers of the same type or all controllers associated with the same power path. To send this request, the controller can use any type of communication, signal or information described before or hereinafter.

In some embodiments, the hand-over of an element to be controlled is initiated by the first controller, i.e. the controller that will control the element after the hand-over. In some implementations, the first controller communicates a request to hand over control to the second controller. In some other implementations, the first controller hands over the control without a request, for example, if the second controller has broken down and is not able to receive a request or to communicate.

In some embodiments, the hand-over is done by switching an information line, i.e. cutting a line for control commands between the second controller and the element to be controlled and establishing a line for control commands between the first controller and the element. This cutting and establishing is realized by switching some physical signal lines connecting the controllers and the element by semiconductor switches, in some implementation. In some other implementations, this is achieved by changing software parameters or shared memory, e.g. by changing some pointers addressing shared memory or a process representing the element.

Besides the controllers described herein, in some embodiments the wind turbine comprises the main wind turbine controller for different sorts of tasks. For example, the wind turbine controller determines whether the wind turbine shall operate, at the current wind speed, in a partial-load mode (in which the efficiency of energy conversion is optimised) or a nominal-load mode (in which nominal power is produced, even if the wind speed would allow production of more power). Besides mechanical operation parameters, such as rotor speed and blade pitch, the wind turbine controller controls parameters for a total electric output. Control of the electric output is performed by influencing the wind turbine's power transfer system.

The wind turbine may be integrated into a wind park that combines a plurality of wind turbines connected by an electric power grid through a main transformer. Each wind turbine feeds the electric power produced by it into the electrical power grid. There may be a wind park controller influencing the wind turbine's power output.

Figure 1:
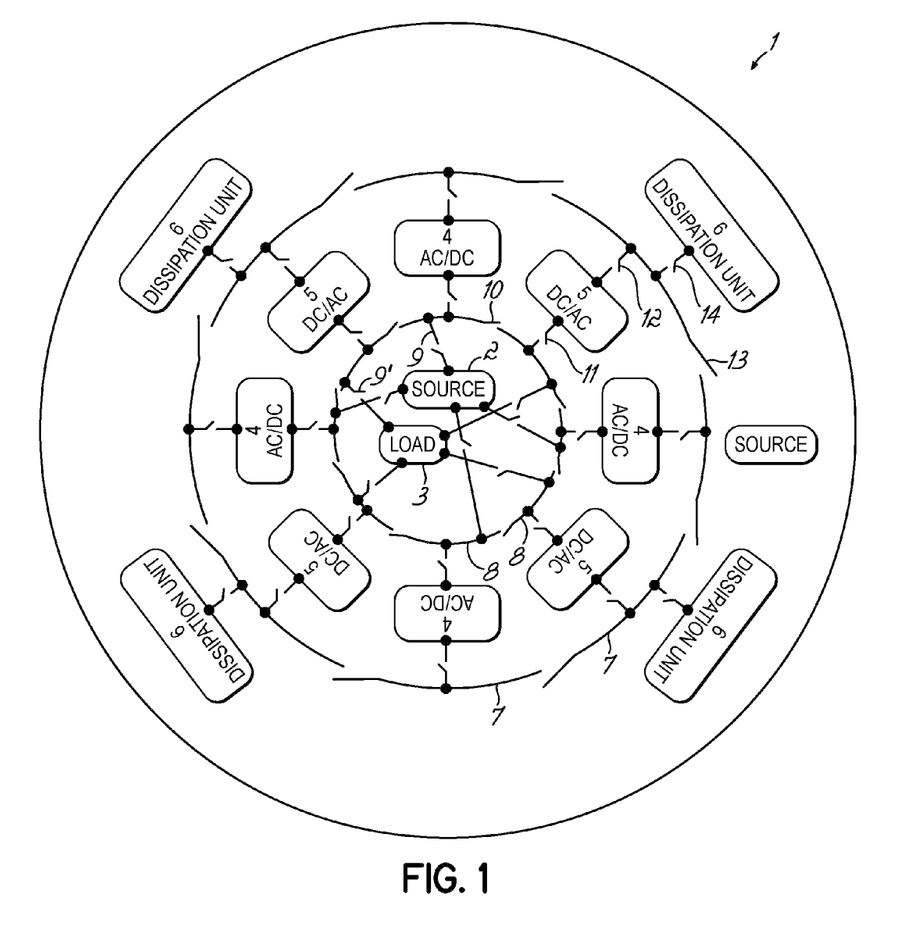
FIG. 1 is a schematic drawing of an arrangement of a power transfer system with a focus on elements of the system.

FIG. 1: Arrangement of Power Transfer System Concerning the Elements

An embodiment of a power transfer system 1 that is arranged to transfer electrical power from AC sources 2 to AC loads 3 is shown in FIG. 1 as a schematic drawing. The power transfer system 1 is part of a wind turbine with an electrical generator that provides the sources 2 and is driven by a wind-turbine rotor. The wind turbine is connected to an electrical power grid providing the loads 3. Neither the generator nor the grid is a part of the power transfer system 1. In this example, the sources 2 and loads 3 are physically power connector elements that connect the system 1 with the generator and the grid, respectively.

In FIG. 1, the generator comprises four generator segments, which can be treated as four independent AC power outputs. Thus, in FIG. 1 the single symbol 2 is to be understood as four sources 2, as shown by the four connection symbols. For example, the generator segments are isolated winding sets of the wind turbine generator, which produce respective three-phase AC power outputs. Such generator segments are often arranged in symmetrical pairs (e. g. in pairs of winding sets axially symmetrically distributed over the stator).

The grid can be treated as four three-phase AC loads 3, e.g. transformers connected with their secondary windings to the electrical power grid, represented by the four connection symbols of the single symbol 3. Thus, sources 2 and loads 3 all are arranged for three phase AC power, wherein the power transfer system 1 feeds the loads 3 by converting the AC power of the sources 2 to fit the requirements of the loads 3, as described in the following.

Further, the system 1 comprises four (three-phase) AC/DC-converters 4, four (three-phase) DC/AC-converters 5 and four power dissipation units 6 as elements. For example, the AC/DC converters 4 are generator-side converters and the DC/AC-converters 5 are grid-side converters of the power transfer system 1, connected by DC links. In other examples, the system 1 comprises more or less than four of these elements 3-6 and/or sources 2 and loads 3. In some examples, the number of power dissipation units 6 is the same or half the number of converters 4 and 5. In some examples, the number of each of the elements 3-6 is a multiple of the number of AC phases provided by the sources 2 and/or the loads 3.

As schematically shown in FIG. 1, the source 2 and load 3 are logically grouped in a first (inner) channel, the converters 4, 5 in a second (middle) channel and the power dissipation units 6 in a third (outer) channel. The outer and the middle channel have some DC-links 7 in common, as the middle and the inner channel have some AC-links 8 in common, represented by lines in FIG. 1.

To transfer the AC power of the sources 2 to the loads 3 the system 1 provides several power paths, i.e. paths of power along the elements 2-6 and the AC- and DC-links 8, 7. The flow of electrical power can be guided by controllable switches 9-14 located along the power paths between the elements 2-6.

The switches 9-14 as well as all other controllable switches mentioned above and below may be any device which allows for a connection controllably broken and made depending on control signals from a controller. For example, the switches may be breakers, contactors with or without a fuse, semiconductor power switches, e.g. insulated-gate bipolar transistors (IGBT), metal oxide semiconductor field-effect transistors (MOS-FETs), gate turn-off (GTO) thyristors, anti-parallel thyristors or controllable diodes. A controllable switch may comprise one or more switches. For example, a controllable switch for breaking and making a three-phase line may comprise three switches, one for each phase line. In another example, a controllable switch comprises redundant switches, e.g. two parallel switches, which allow for the corresponding connection selectively made and broken even if one of the switches is damaged. Herein, the expression "closing" a switch designates controlling the switch to make a connection; the expression "opening" a switch designates controlling the switch to break a connection.

Next, the arrangement will be described by following the flow of power. Starting at the sources 2, each source is individually connectable to an associated AC-link 8 by closing an associated source switch 9. This AC-link 8 is directly connectable to an associated AC/DC-converter 4 by closing an associated AC-side converter switch 11. (For better overview, FIG. 1 exemplarily shows only one corresponding reference sign 7-14.) Alternatively or in addition thereto, the flow of power may be redirected or divided by AC-link switches 10 each connection two AC-links 8. Opposite to the AC-links 8, a DC-side converter switch 12 is associated to each converter 4, with the switch 12 being arranged to connect or disconnect the associated converter 4 and the DC-link 7. Further, each DC-link 7 may be coupled with at least one adjacent DC-link 7 by DC-link switches 13.

Up to now, the power has reached the DC-links 7. In general, the DC-link 7 may comprise a capacitive energy storage (e.g. a capacitor), or—especially when only low currents occur—an inductive energy storage (e.g. an inductor).

From here, the power may be guided to a load 3 passing at least one DC/AC converter 5 in a reverse sense as described before, according to the AC/DC converter 4, wherein the loads 3 are individually connectable to adjacent AC-links 8 by load switches 9'. Alternatively or additionally, some or all power in the DC-link 7 and/or from one or more adjacent controllers 4, 5 may be dissipated with a power dissipation unit 6 by closing a power dissipation unit switch 14. For example, this may be helpful in the case of a converter failure, a failure of sources 2 or loads 3—especially to ensure symmetrical stress of symmetrical segments of the segmented generator, in the case of an imbalance of sources 2 and loads 3 and in the case of a transient, e.g. when switching power paths, at alternation of load, starting or shutting down a source 2 and/or a load 3.

Each of the power dissipation units 6 may comprise a resistor in series to the switch 14. The amount and rate of power dissipation is controllable by varying duty cycles of pulse width modulated (PWM) operation of the (power electronic) switch 14 in series with the resistor. Power dissipation may be increased by connecting at least one further power dissipation unit 6 by closing at least one DC-link switch 13 to couple adjacent DC-links 7. In other examples, a power dissipation unit may be connectable with an AC-link. For example, such a power dissipation unit may comprise a plurality of resistors, each resistor connectable to a separate AC phase.

The arrangement of the power transfer system 1 allows several connecting combinations at least one AC/DC-controller 4 with at least one DC/AC-controller 5 using at least one DC-link 7. These combinations build at least one frequency converter, connecting the source 2 and the load 3 via at least two AC-links 8. Such a frequency converter can be (freely) configured to involve one or more individual AC/DC converters 4 and/or one or more individual DC/AC-converters 5, wherein the numbers of different converters 4 and 5 may be the same or different. Thus the (maximum) power throughput of the so-built frequency converters is configurable (on demand) while operating the system 1.

Figure 2:
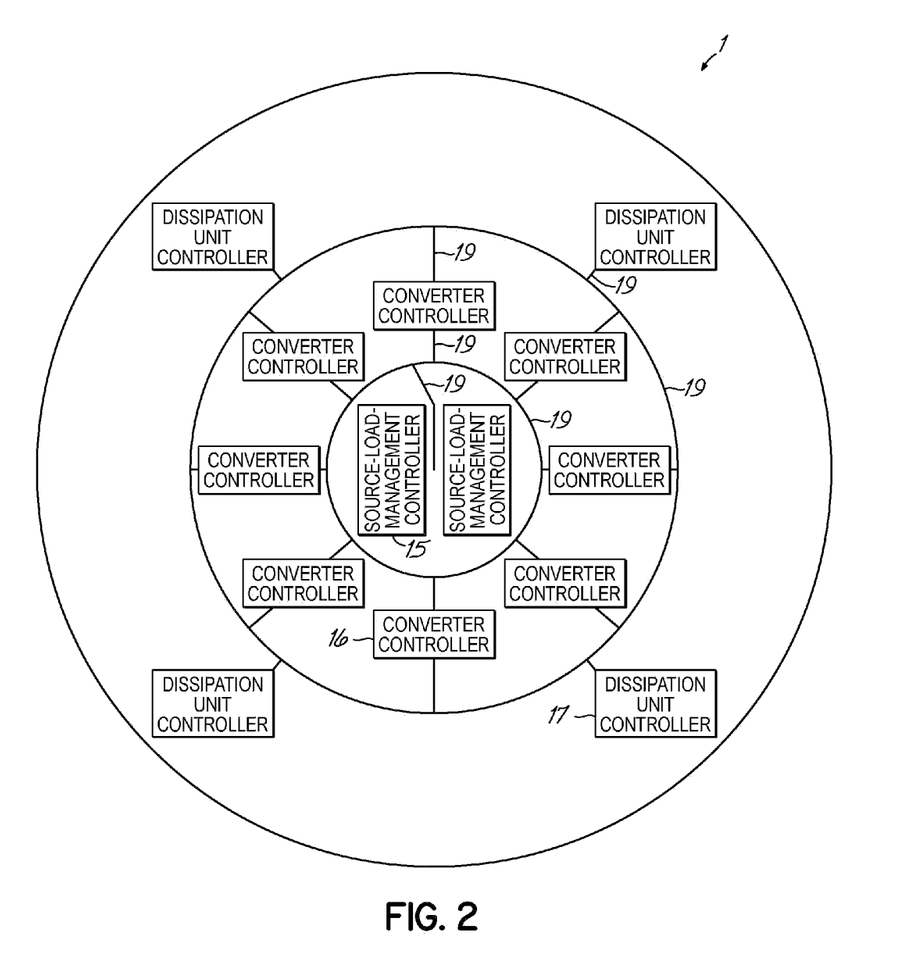
FIG. 2 is a schematic drawing of an arrangement of the power transfer with a focus on the controllers of the system.

FIG. 2: Arrangement of Power Transfer System Concerning the Controllers

FIG. 2 shows the same system 1 as FIG. 1, but as a schematic circuit-diagram of controllers 15-17. The controller arrangement supports independent controller functionality as well as shared controller functionality, for example in the event of one or more controllers being damaged or during transient events, e.g. where the existing controller functionality is taken over by an adjacent controller.

As a comparison of FIGS. 1 and 2 shows, each of the elements 2-6 shown in FIG. 1 is associated with a controller 15-17 shown in FIG. 2: Source-load-management controllers 15 are associated with the inner channel and with the sources 2 and loads 3 respectively; converter controllers 16 are associated with the middle channel and with the converters 4, 5 and power dissipation unit controllers 17 are associated with the outer channel and with the power dissipation units 6.

In addition to this association, each controller 15-17 is arranged to control a second element 2-6 in addition to its associated element. Thus all controllers 15-17 are arranged to control only a single (the associated) element 2-6 as well as to control two elements at the same time, i.e. the associated (first) element 2-6 and a further (second) element 2-6 associated to another controller 15-17 (of the same type). For example, when operating the system 1, at one time a specific converter controller 15 may control (only) the associated one converter 4, at another time the same controller 15 may control both, the associated converter 4 and second converter 4 of the same type. In another example, the controller 16 is arranged to control two elements 4, 5 of different type, namely an AC/DC-converter 4 and a DC/AC-converter 5, at the same time.

Before describing further details of controller sharing, some general aspects will first be mentioned.

The controllers 15, 16, 17 are arranged to monitor the state of associated elements 2-6 to pass information to each other regarding the state of health of the system 1 and other relevant information for optimized and self-organized operation of the system 1.

The source-load-management controllers 15 are arranged to monitor the state of the sources 2 and loads 3. Further, the source-load-management controllers 15 control the source switches 9 and the load switches 9' for individually connecting (and disconnecting) single sources 2 and loads 3. For example, in the event of excessive load of system 1 or at a fault condition of the generator, at least one source 1 may be disconnected; in other cases the grid or a sub-network of the grid may be disconnected from the system 1.

The converter controllers 16 are arranged to monitor and control the health of the converters 4, 5. They have the primary function of establishing a healthy converter operation and optimizing the power throughput through each of the converters 4, 5 and, even more, the throughput of the total power produced by the generator to the grid based on the available wind. Further, the converter controllers are arranged to control the converter switches 11, 12 adjacent to the converters 4, 5, thus controlling whether the converters 4, 5 are connected to the DC-links 7 or AC-links 8 or not. Furthermore, the controllers 16 directly drive the converter's switching semiconductors, i.e. semiconductors of a rectifier of the AC/DC-converter 4 and/or switching semiconductors of an inverter of the DC/AC-converter 5 respectively. So, they control the power fed into to DC-link 7 (e.g. DC-voltage and/or DC-current) and/or the power (e.g. frequency, amplitude, phase) fed into the AC-link 8.

The power dissipation unit controllers 17 are arranged to monitor and control the health of the power dissipation units 6 and to optimize the power balance of the whole system 1, especially between power paths connected (via different sources) to different generator segments. The controllers 17 control whether the units 6 are connected to the DC-links 7 or not. Further, they control the amount of dissipated power by directly driving the switches 14 with PWM signals. Further tasks of the different controller types are described in FIG. 4.

In other examples, the controllers 16 and 17 do not directly control switching semiconductors of the elements 4, 5 and 6. They control the elements by providing control commands and/or set points, e.g. for power reference, AC or DC voltage and/or current, frequency, amplitude and phase of an AC signal, PWM frequency and/or on/off ratio. In that case the elements 16 and 17 are more "intelligent", e.g. having a microcontroller arranged to fulfil these requirements autonomously.

In one embodiment, each of the controllers 15-17 is represented by a process which is part of common controller software that is executed by a computer of the wind turbine. Each process is associated with some input and/or output ports (I/O-ports) of the computer which are parts of the controller, too. Thus, the controller is implemented by a combination of hardware and software. (Alternatively, the I/O-ports may be assigned to the elements, thus the controller is created by software only.) In this embodiment the controllers communicate (see FIG. 4) by using shared memory that is accessible by all controller processes and by inter-process communication. The elements 2-6 are electrically connected to the corresponding I/O-ports to establish communication between controller and controlled element.

In another embodiment each controller is represented by a single physical device, each having a microcontroller for controlling the at least one element and for communication with other controllers. All elements that are in principle controllable by a specific controller are electrically connectable to this controller by signal lines 18 and switches. Furthermore, the controllers are connected to each other by communication lines 19, e.g. by a common data bus or by single signal lines each connecting two controllers (see FIG. 3a, 3b).

Now, coming back to controller sharing, the controller arrangement enables a first element to be controlled by a first controller and a second element to be controlled by a second controller (independent mode) as well as both, the first and the second element, to be controlled by the first controller while the first or the second element is not controlled by the second controller (sharing mode). The controllers 15-17 are organized as a network building a distributed system. They are connected to each other by communication lines 19.

In an independent mode, a controller actively controls a single (associated) element. So, adjacent (other) elements may be controlled by adjacent (other) controllers. Besides this, shared control functionality is the state when a controller took over functional responsibility to an element which was (previously) governed by another active controller. Shared mode may limit fault effects or increase power throughput to the load.

In one embodiment, in shared mode, one controller controls two adjacent elements in unison, for example by mirrored driving of the I/O-ports or by connecting corresponding signal lines between controller and controlled element.

In an alternative embodiment, in shared mode, one controller controls two adjacent elements independently. In this embodiment, each of the controllers is equipped with two independent control units, one unit controlling the associated first element and the other unit controlling the second element. In independent mode, only one of these units is active, as the other one may rest and can be designated as a backup, thus increasing redundancy. For example, these units are separate threads of the controller process.

However, all controllers 15-17 act as an independent controller managing solely its controlled element(s) based on knowledge of which controllers control adjacent elements to itself. Furthermore, controlling is based on inputs from controllers present in the same and other channels. Thus, each controller decides in a stand-alone manner whether to control only one element or two elements at the same time—there is no master that assigns a particular element to a particular controller. Deciding in a stand-alone manner means that the controller makes its own decision based on its knowledge about the other elements and controllers and on its own status. The hand-over of an element from another (second) controller may be initialized by the other (second) controller by request, for example if the second controller finds out any internal fault by itself. Furthermore, hand-over may be initialized by the (first) controller that will take the element over, for example, if the first controller discovers a fault of the second controller, e.g. by actively observing and/or analysing the received information about adjacent elements and controllers. Even the fact, that the (faulty) second controller does not send any information any more, may be used to start a hand-over (take over) of the element associated with the second controller.

Figure 3A:
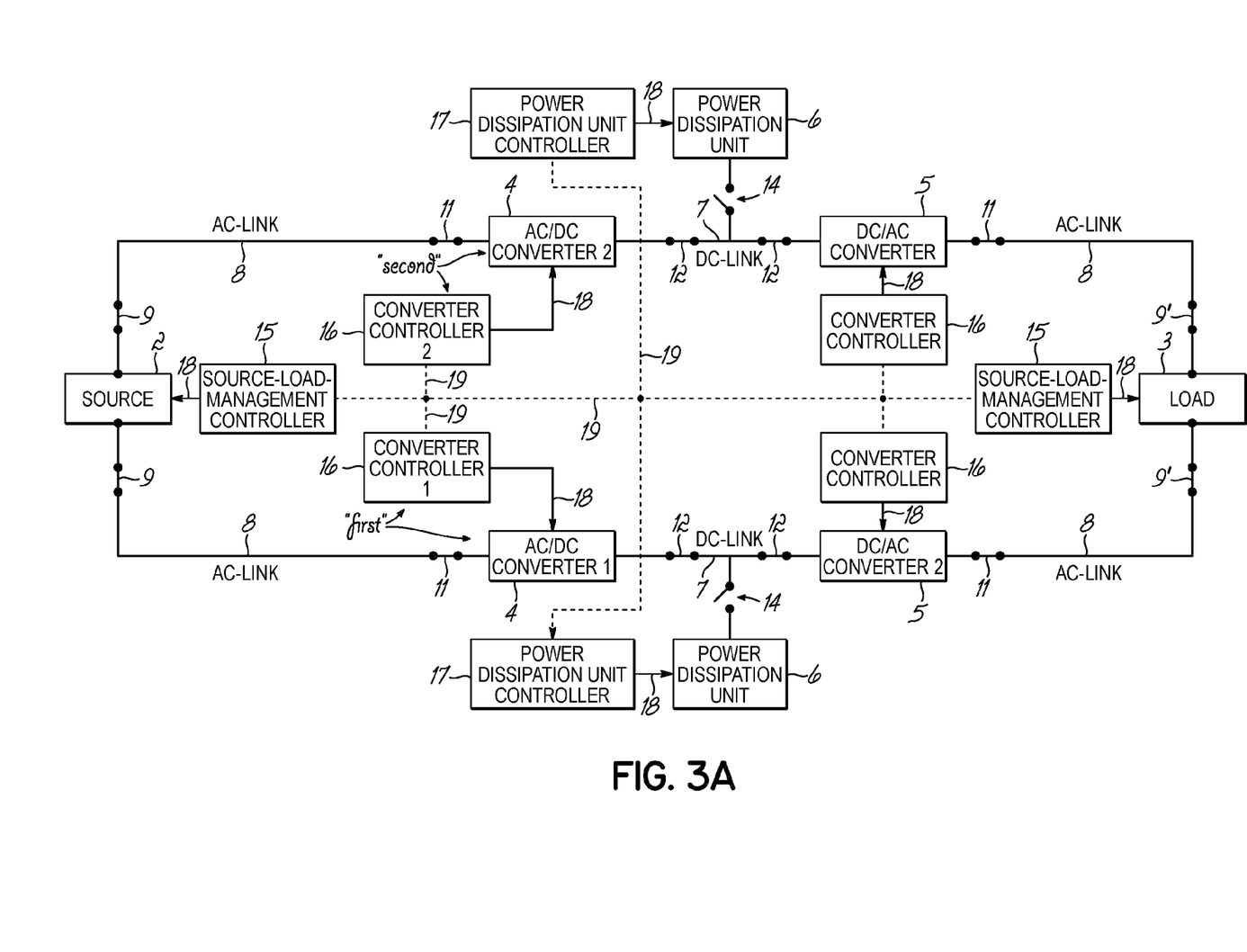
FIGS. 3a and 3b are schematic drawings of two power paths of the power transfer system showing controller sharing.
Figure 3B:
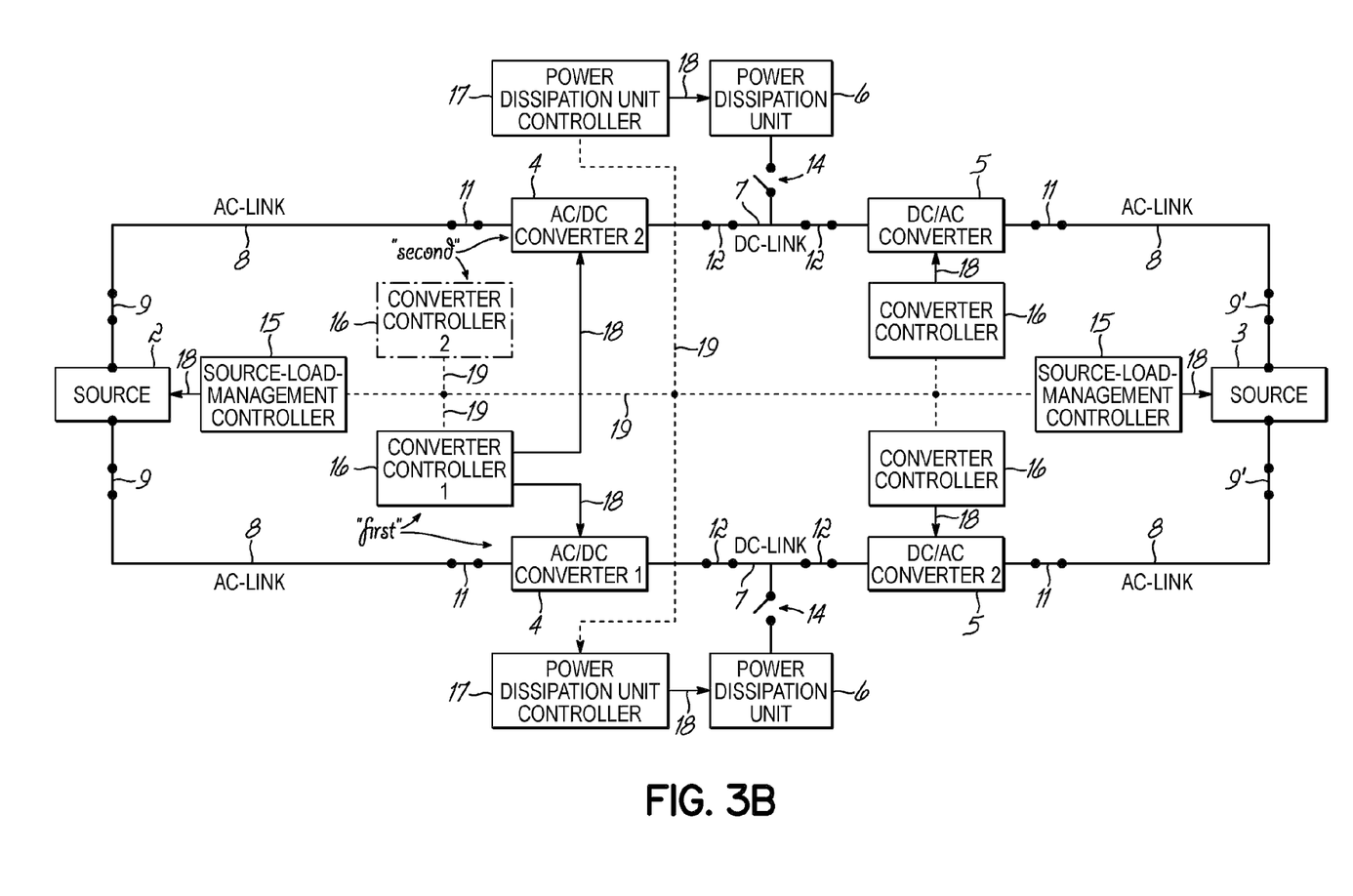
Figure 3C:
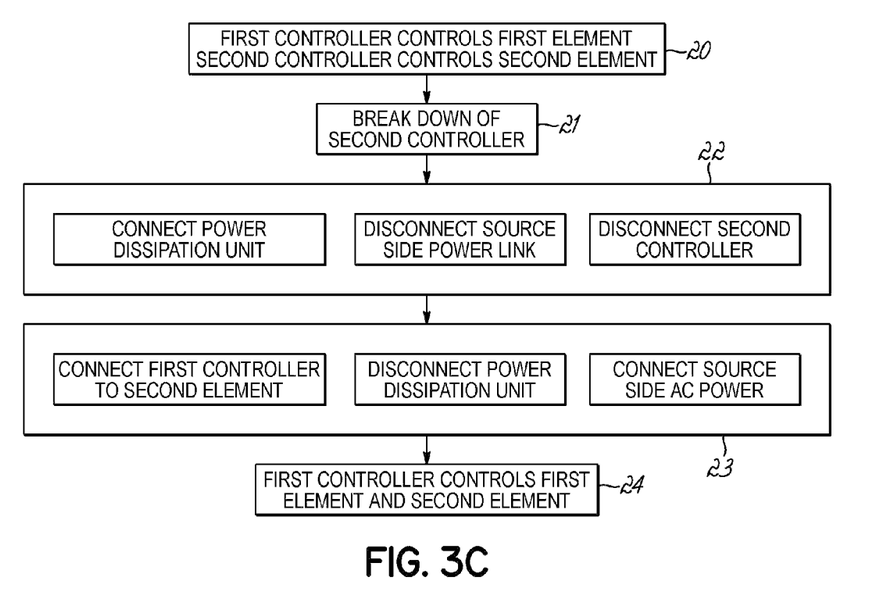
FIG. 3c is a schematic drawing of hand-over stages.

FIG. 3a-c: Hand-Over

Hand-over is explained by the following example. FIG. 3a shows schematically a part of the system 1 with two power paths (along the solid lines) before the hand-over. FIG. 3b shows the same part after hand-over. Signal lines 18 are drawn as solid arrows, wherein the directions of the arrows show the relation "controlling—to be controlled". Communication lines 19 are drawn as dotted lines. The example is shown on a "first" converter controller 16 and AC-DC converter 4 and a "second" converter controller 16 and AC-DC converter 4 in the left half of FIG. 3a, 3b. Different stages of the hand-over are shown in FIG. 3c schematically.

According to 20 (see FIG. 3c), before a hand-over, the first converter controller is the functional controller of the first converter while the second converter controller is the functional controller of the second converter. According to FIGS. 1 and 2 the first controller is associated with the first converter and the second controller is associated with the second converter. In the event that (for example) the second controller breaks down in 21 (dash dotted line in FIG. 3b), the first controller takes functional control over the second converter. This happens without the first controller losing any control functionality over the first converter. As a consequence of the break down, the second converter is not controlled any more. The information about the break down is provided via the communication lines 19, e.g. by a broadcast signal sent by the second controller or by setting the shared memory to a value indicating the error status (if it is still able to communicate). This information may also be provided by the fact, that the second controller does not show any sign of life any more.

This information is received (by all controllers and especially) by the power dissipation unit controllers 17 associated with the power path of the second converter. In 22, this controller 17 will (self-acting) start driving the switches 14 to connect the power dissipation unit 6 to the DC-link to dissipate the DC side power of the second converter. In another example, the (source side) power that should be handled by the second converter is dissipated.

Moreover, the information about the break down is received by the first controller, too, which (continuously) analyzes all received information about the system 1. Since the first controller controls only the single first element at that point of time, it is in principle able to control one further element.

Thus, the first controller starts hand-over (or "take-over", since the second controller is not actively involved due to break down) with disconnecting the second converter from the source side AC-link 8 in 22. Thus, no more power will be guided to the non-controlled second converter. To hand over the element, the first controller also disconnects the second controller from the second converter in 22, e.g. by changing pointers of the control process of the second controller to a NIL value (i.e. pointing to nowhere), or by physically disconnecting the signal lines 18 between the second controller and the second converter by using semiconductor switches.

Then the second converter is connected to the first controller in 23, e.g. by physically switching connecting signal lines 18 or by mirroring the (software) control commands for the first converter to the second converter (in the case of controlling two converters by the first controller in unison), or by connecting a (so far inactive) second controller unit of the first controller to the second converter. Thus, the functionality of the second converter is handed-over to the first controller. Then the power dissipation units 6 are disconnected by the controller 17 in 23 and the source side AC-link 8 is connected to the second controller.

Finally, in 24 the first controller controls both, the first and the second element, while the second controller controls nothing, since it has broken down. This ensures that the power transfer system 1, and thus the wind turbine, will not go off-line in the event of a controller break-down.

For example, this applies to any two converter controllers 16 as well as to any two power dissipation unit controllers 17 controlling two converters 4 and/or 5 and two power dissipation units 6 respectively. It also applies to source-load-management controllers 15 and sources 2 and loads 3 respectively.

In another embodiment, additionally or alternatively a healthy controller (with no fault condition) is taken over by another controller. So, a single controller is controlling two elements in a normal mode. Thus, if (later) a system fault arises, the effect of the fault is mitigated, the power throughput to the load is optimized and/or the mechanical stability of the generator is maintained.

Figure 4:
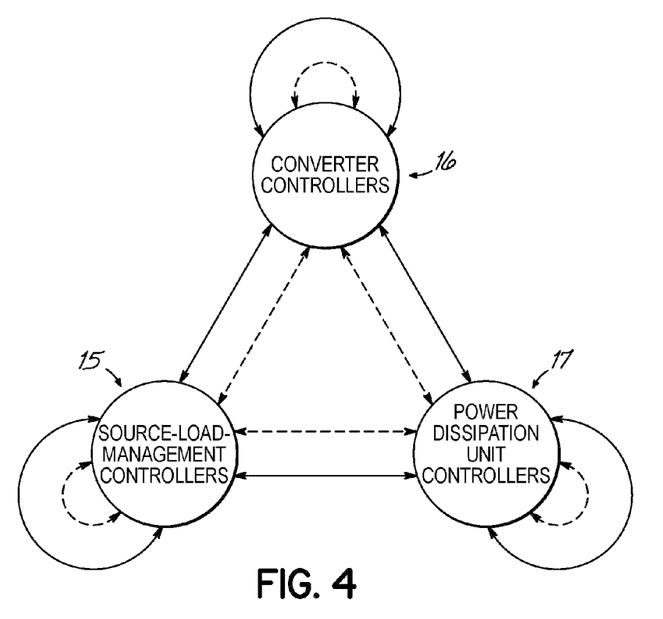
FIG. 4 is a schematic diagram showing the communication of the controllers.

FIG. 4: Communication of Controllers

FIG. 4 shows the information being shared between different controller types. Each circle represents all controllers 15-17 of the same type. In this embodiment, information is exchanged by broadcasted to all controllers of all types with individual controllers intelligently picking out the information they need for functional decision making. As mentioned before, inter-controller communication is realized by shared memory and inter-process communication. (In some alternative embodiments, the sending controller targets a particular receiving controller. In some embodiments, this inter-controller communication is realized by physical communication links.)

Solid lines represent the exchange of event information 18, e.g. about status and error; dotted lines represent the exchange of signal information 19, e.g. about system parameters.

The source-load-management controllers 15 provide event information to all other controllers, e.g. about status and/or error of the sources 2, the loads 3 and/or the controllers 15 itself, or about overall system commands, e.g. start-up, shutdown, generate power. Further, they provide real-time signal information to all other controllers, e.g. about desired individual converter power set points, available source power, load power consumption.

The converter controllers 16 provide event information to all other controllers, e.g. about status and/or error of the converters 4, 5 and/or the controllers 16 themselves. Furthermore, they provide real-time signal information to all other controllers, e.g. about the rate of power to be converted and/or energy stored in the links 7, 8.

The power dissipation unit controllers 17 provide event information to all other controllers, e.g. about status and/or error of the power dissipation units 6 and/or the controllers 17 themselves. Furthermore, they provide real-time signal information to all other controllers, e.g. about the amount and/or rate of power to be dissipated and or health conditions of the power dissipation elements, e.g. temperature.

The shared information allows each controller to make functional decisions independently in order to achieve the desired system behaviour in both independent and shared modes described above.

All publications mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A controller arrangement of an electrical power transfer system of a wind turbine, wherein the wind turbine comprises an electrical generator and is connected to an electrical power grid, wherein the power transfer system is arranged to transfer electrical power from the generator to the grid;

wherein the power transfer system comprises at least two electrical power converters and at least two converter controllers;

wherein the at least two electrical power converters are electrically connected in parallel providing at least two power paths of the power transfer system, and both of the at least two power paths are arranged to transport electrical energy from the electrical generator to the electrical power grid in a normal operation mode of the electrical power transfer system;

wherein the at least two converter controllers are each arranged to control one of the at least two electrical power converters as well as at least two of the electrical power converters;

wherein the controller arrangement enables a first one of the at least two electrical power converters to be controlled by a first one of the at least two converter controllers and a second one of the at least two electrical power converters to be controlled by a second one of the at least two converter controllers, as well as the first and the second electrical power converters to be controlled by the first converter controller while the first or the second electrical power converter is not controlled by the second converter controller; and wherein the electrical generator is divided into a plurality of generator segments, which produce a plurality of independent AC power outputs and represent separate power sources, wherein at least two of the electrical power converters are coupled to different power sources.

2. The controller arrangement of claim 1, wherein the power transfer system comprises at least one AC/DC-converter and at least one DC/AC-converter, and at least one DC-link arranged to couple the at least one AC/DC-converter and the at least one DC/AC-converter.

3. The controller arrangement of claim 1, wherein the power transfer system further comprises a power dissipation unit having an input, and at least one of the electrical power converters further comprises a DC link selectively coupleable to the input of the power dissipation unit.

4. The controller arrangement of claim 3, wherein the first converter controller is arranged to decide in a stand-alone manner whether to control only one of the electrical power converters or to control at least two of the electrical power converters at the same time.

5. The controller arrangement of claim 1, wherein at least one of the generator and the grid provides at least two sources and at least two loads respectively, and wherein the power transfer system further comprises at least two source-load-management-controllers each arranged to monitor at least one of the source and the load.

6. The controller arrangement of claim 5, wherein the power transfer system further comprises at least two of power dissipation units and at least two power dissipation unit controllers.

7. The controller arrangement of claim 5, wherein the first converter controller is arranged to decide in a stand-alone manner whether to control only one of the electrical power converters or to control at least two of the electrical power converters at the same time.

8. The controller arrangement of claim 7, wherein the power transfer system further comprises at least one power dissipation unit controller, wherein the converter controllers are arranged to provide at least one of information about themselves and information about at least one the electrical power converters to the at least one power dissipation unit controller.

9. The controller arrangement of claim 1, wherein the first converter controller is arranged to control the at least two electrical power converters in unison.

10. The controller arrangement of claim 1, wherein the first converter controller is arranged to control the at least two electrical power converters independently.

11. The controller arrangement of claim 1, wherein the second converter controller is arranged to generate a signal targeted to the first converter controller to provide at least one of information about itself and information about at least one of the electrical power converters controlled by it.

12. The controller arrangement of claim 1, wherein the second converter controller is arranged to generate a broadcast signal to provide at least one of information about itself and information about at least one of the electrical power converters controlled by it.

13. The controller arrangement of claim 1, wherein the first converter controller is arranged to decide in a stand-alone manner whether to control only one of the electrical power converters or to control at least two of the electrical power converters at the same time.

14. The controller arrangement of claim 1, wherein the power transfer system further comprises at least one power dissipation unit controller, wherein the converter controllers are arranged to provide at least one of information about themselves and information about at least one of the electrical power converters to the power dissipation unit controller.

15. The controller arrangement of claim 1, wherein the power transfer system further comprises at least one power dissipation unit controller, wherein at least one of the converter controllers is arranged to provide at least one of information about itself and information about at least one of the electrical power converters to the at least one power dissipation unit controller.

16. The controller arrangement of claim 1, wherein the power sources are three-phase AC power sources.

17. The controller of claim 1, wherein at least one of the electrical power converters is selectively coupleable to at least two of the plurality of separate power sources.

18. The controller arrangement of claim 1, wherein
the first one of the at least two electrical power converters includes a first AC/DC converter and a first DC/AC converter;
the second one of the at least two electrical power converters includes a second AC/DC converter and a second DC/AC converter; and
one of the first and second AC/DC converters is selectively coupleable to one of the first and second DC/AC converters.

19. The controller arrangement of claim 18, wherein the one of the first and second AC/DC converters is selectively coupled to the other of the first and second DC/AC converters in response to a failure in the one of the first and second DC/AC converters.

20. The controller arrangement of claim 18, wherein the one of the first and second DC/AC converters is selectively coupled to the other of the first and second AC/DC converters in response to a failure in the other of the first and second AC/DC converters.

21. The controller arrangement of claim 1, wherein each of the at least two electrical power converters comprises a source side converter and a load side converter, the load side converter of the first of the at least two power converters being configured to handle the power supplied by the source side converter of the second of the at least two the power converters, and the load side converter of the second of the at least two power converters being configured to handle the power supplied by the source side converter of the first of the at least two the power converters.

22. The controller arrangement of claim 1, further comprising:
a power dissipation unit,
wherein the first one of the at least two converter controllers is configured to disconnect the second one of the at least two electrical power converters from one of the at least two power paths and connect the second one of the at least two electrical power converters to the power dissipation unit in response to a fault condition caused by the second one of the at least two converter controllers.

23. The controller arrangement of claim 22, wherein the first one of the at least two converter controllers is further configured to disconnect the second one of the at least two electrical power converters from the power dissipation unit and reconnect the second one of the at least two electrical power converters to the one power path in response to the first one of the at least two converter controllers assuming control of the second one of the at least two electrical power converters.

24. A method of controlling a controller arrangement of an electrical power transfer system of a wind turbine, wherein the wind turbine comprises an electrical generator and is connected to an electrical power grid, wherein the power transfer system is arranged to transfer electrical power from the generator to the grid, and wherein the electrical generator and the grid provide at least one source and load respectively;
wherein the power transfer system comprises at least two electrical power converters, at least two converter controllers, at least one power dissipation unit, at least one dissipation unit controller, and a power path arranged to transfer electrical power to the load,
wherein the at least two electrical power converters are electrically connected in parallel providing at least two power paths of the power transfer system, wherein both of the at least two power paths transport electrical energy from the electrical generator to the electrical power grid in a normal operation mode of the electrical power transfer system, and
wherein the at least two converter controllers are each arranged to control one of the at least two electrical power converters as well as at least two of the electrical power converters;
the method comprising:
switching between controlling a first one of the at least two electrical power converters with a first converter controller of the at least two converter controllers and a second one of the at least two electrical power converters with a second converter controller of the at least two converter controllers, and controlling the first one and the second one of the at least two electrical power converters with the first converter controller while not controlling the first one or the second one of the at least two electrical power converters with the second converter controller, wherein both the first one and the second one of the at least two electrical power converters are connected to the power path; and
while controlling the first one of the at least two electrical power converters with the first converter controller and the second one of the at least two electrical power converters with the second converter controller, and in response to a fault condition caused by the second converter controller:
disconnecting the second electrical power converter from the power path and connecting the second power converter to the power dissipation unit controlled by the at least one power dissipation unit controller,
handing over control of the second electrical power converter to the first converter controller, and
disconnecting the second electrical power converter from the power dissipation unit and reconnecting the second electrical power converter to the power path.

25. The method of claim 24, wherein the switching is triggered by a fault condition.

26. The method of claim 24, wherein the generator is divided into a plurality of generator segments, which produce a plurality of independent AC power outputs and represent separate power sources, wherein at least two of the electrical power converters are coupled to different power sources.

27. The method of claim 26, wherein the power sources are three-phase AC power sources.

28. The method of claim 24, wherein the generator and the grid provide a source and a load respectively, and the power transfer system further comprises a power dissipation unit, a power dissipation unit controller, and a power path arranged to transfer electrical power to the load, the method comprising:
controlling a first electrical power converter of the at least two electrical power converters with a first converter controller of the at least two converter controllers and a second electrical power converter of the at least two electrical power converters with a second converter controller of the at least two converter controllers with both the first and the second electrical power converters being connected to the power path; and
in response to a fault condition caused by the second converter controller, disconnecting the second electrical power converter from the power path and connecting the second power converter to the power dissipation unit controlled by the power dissipation unit controller.

29. The method of claim 28, further comprising handing over control of the second electrical power converter to the first converter controller.

30. The method of claim 28, further comprising disconnecting the second electrical power converter from the power dissipation unit and reconnecting the second electrical power converter to the power path.

31. A controller arrangement of an electrical power transfer system of a wind turbine, wherein the wind turbine comprises an electrical generator and is connected to an electrical power grid, wherein the power transfer system is arranged to transfer electrical power from the generator to the grid, the controller arrangement comprising:
at least two electrical power converters electrically connected in parallel providing at least two power paths of the power transfer system, and both of the at least two power paths are arranged to transport electrical energy from the electrical generator to the electrical power grid in a normal operation mode of the electrical power transfer system
a first converter controller and a second converter controller, each converter controller arranged to selectively control only one of the power converters or at least two of the power converters, wherein, when the first converter controller is controlling at least two of the power converters, the second controller does not control the at least two power converters; and
a power dissipation unit,
wherein, in response to a fault condition caused by the second converter controller when controlling one of the power converters, the first converter controller is configured to disconnect the one power converter from one of the at least two power paths and connect the one power converter to the power dissipation unit.

32. A controller arrangement of an electrical power transfer system of a wind turbine, wherein the wind turbine comprises an electrical generator and is connected to an electrical power grid, wherein the power transfer system is arranged to transfer electrical power from the generator to the grid;
wherein the power transfer system comprises at least two electrical power converters and at least two converter controllers;
wherein the at least two electrical power converters are electrically connected in parallel providing at least two power paths of the power transfer system, and both of the at least two power paths are arranged to transport electrical energy from the electrical generator to the electrical power grid in a normal operation mode of the electrical power transfer system;

wherein the at least two converter controllers are each arranged to control one of the at least two electrical power converters as well as at least two of the electrical power converters;

wherein the controller arrangement enables a first one of the at least two electrical power converters to be controlled by a first one of the at least two converter controllers and a second one of the at least two electrical power converters to be controlled by a second one of the at least two converter controllers, as well as the first and the second electrical power converters to be controlled by the first converter controller while the first or the second electrical power converter is not controlled by the second converter controller; and wherein:
the first one of the at least two electrical power converters includes a first AC/DC converter and a first DC/AC converter;
the second one of the at least two electrical power converters includes a second AC/DC converter and a second DC/AC converter; and
one of the first and second AC/DC converters is selectively coupleable to one of the first and second DC/AC converters.

33. A controller arrangement of an electrical power transfer system of a wind turbine, wherein the wind turbine comprises an electrical generator and is connected to an electrical power grid, wherein the power transfer system is arranged to transfer electrical power from the generator to the grid;

wherein the power transfer system comprises at least two electrical power converters and at least two converter controllers;

wherein the at least two electrical power converters are electrically connected in parallel providing at least two power paths of the power transfer system, and both of the at least two power paths are arranged to transport electrical energy from the electrical generator to the electrical power grid in a normal operation mode of the electrical power transfer system;

wherein the at least two converter controllers are each arranged to control one of the at least two electrical power converters as well as at least two of the electrical power converters;

wherein the controller arrangement enables a first one of the at least two electrical power converters to be controlled by a first one of the at least two converter controllers and a second one of the at least two electrical power converters to be controlled by a second one of the at least two converter controllers, as well as the first and the second electrical power converters to be controlled by the first converter controller while the first or the second electrical power converter is not controlled by the second converter controller; and wherein each of the at least two electrical power converters comprises a source side converter and a load side converter, the load side converter of the first of the at least two power converters being configured to handle the power supplied by the source side converter of the second of the at least two the power converters, and the load side converter of the second of the at least two power converters being configured to handle the power supplied by the source side converter of the first of the at least two power converters.

34. A method of controlling a controller arrangement of an electrical power transfer system of a wind turbine, wherein the wind turbine comprises an electrical generator and is connected to an electrical power grid and wherein the power transfer system is arranged to transfer electrical power from the generator to the grid, wherein the power transfer system comprises at least two electrical power converters and at least two converter controllers, wherein the at least two electrical power converters are electrically connected in parallel providing at least two power paths of the power transfer system, wherein both of the at least two power paths transport electrical energy from the electrical generator to the electrical power grid in a normal operation mode of the electrical power transfer system, and wherein the at least two converter controllers are each arranged to control one of the at least two electrical power converters as well as at least two of the electrical power converters;

the method comprising:
switching between
controlling a first one of the at least two electrical power converters with a first converter controller of the at least two converter controllers and a second one of the at least two electrical power converters with a second converter controller of the at least two converter controllers; and
controlling the first and the second electrical power converter with the first converter controller while not controlling the first or the second electrical power converter with the second converter controller, wherein the generator and the grid provide a source and a load respectively, and the power transfer system further comprises a power dissipation unit, a power dissipation unit controller, and a power path arranged to transfer electrical power to the load, the method further comprising:

controlling a first electrical power converter of the at least two electrical power converters with a first converter controller of the at least two converter controllers and a second electrical power converter of the at least two electrical power converters with a second converter controller of the at least two converter controllers with both the first and the second electrical power converters being connected to the power path; and in response to a fault condition caused by the second converter controller, disconnecting the second electrical power converter from the power path and connecting the second power converter to the power dissipation unit controlled by the power dissipation unit controller.

* * * * *